C. F. DUNDERDALE.
APPARATUS FOR THE PRODUCTION OF OZONE.
No. 100,736.
2 Sheets—Sheet 1.
Patented Mar. 15, 1870.
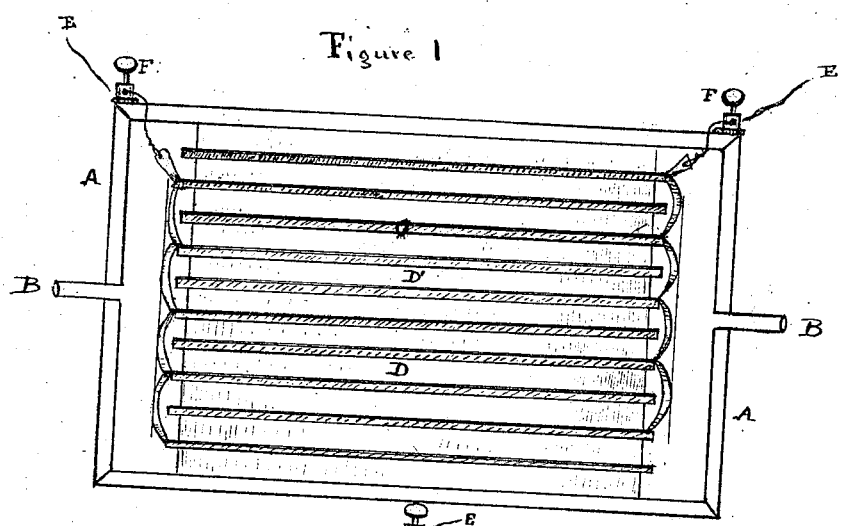
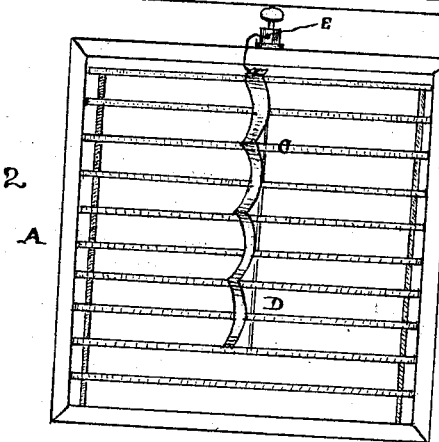
WITNESSES
INVENTOR

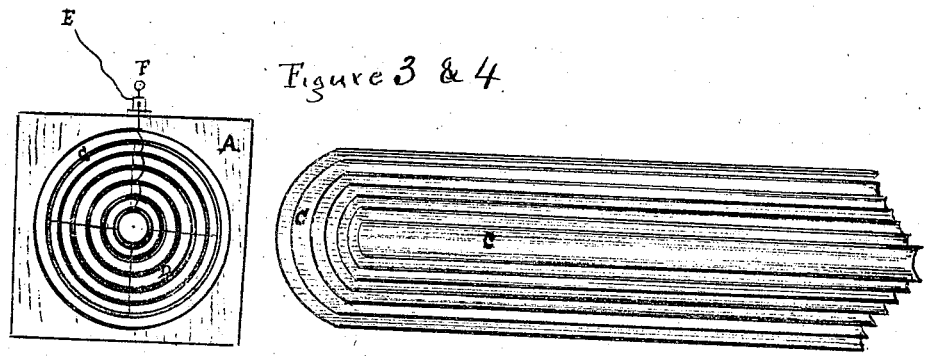
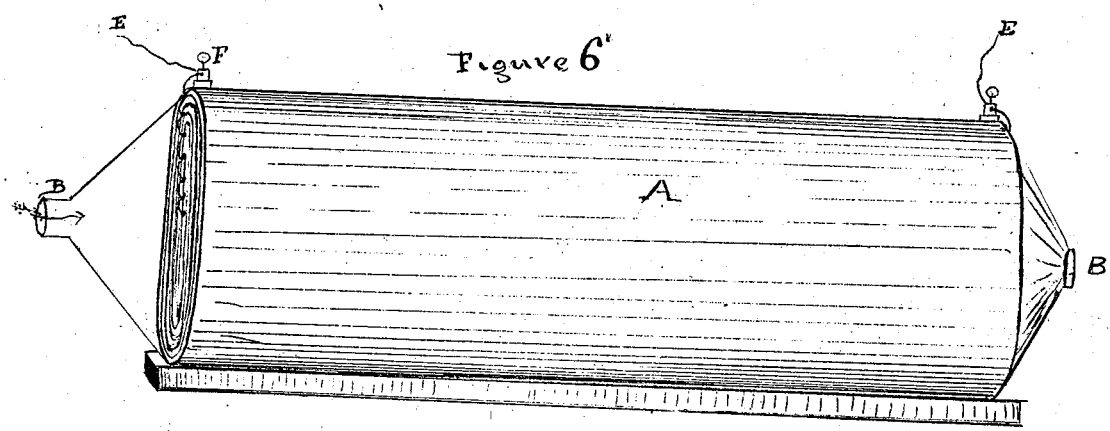
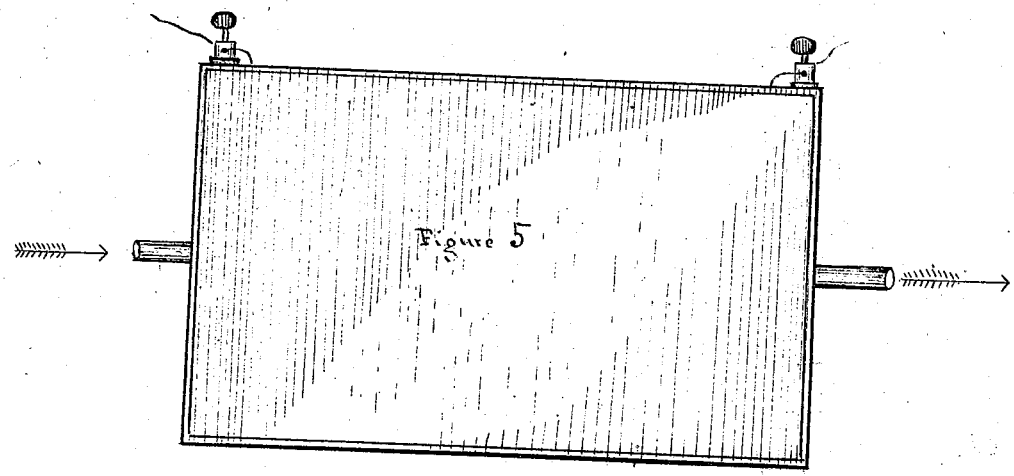

United States Patent Office.

CLEAVELAND F. DUNDERDALE, OF NEW YORK, N. Y.

Letters Patent No. 100,736, dated March 15, 1870.

IMPROVEMENT IN APPARATUS FOR THE PRODUCTION OF OZONE.

The Schedule referred to in these Letters Patent and making part of the same

I, CLEAVELAND F. DUNDERDALE, of New York city, in the county and State of New York, have invented certain Improvements in Apparatus for Producing Ozone in large quantities, of which the following is a specification.

The principle of my invention relates to the combination of a number of plates or tubes of glass, silvered on one side, or by putting thereon a metal foil, or otherwise rendered a conductor of the electrical current, so placed in close proximity to each other as to leave only a narrow space between each for a current of atmospheric air or oxygen to pass or circulate.

The foil or silver coating on each plate or tube is alternately connected with the two wires of a chemical or mechanical electrical machine or galvanic battery. The tubes or plates are arranged in a box or other encasement rendered air-tight on its sides, and the inside covered with glass or other non-conducting material, to insulate the current of electricity passing through the plates, the wires connecting the alternate plates with the battery being insulated by the proper material where they pass through the box or casing side.

The air or oxygen to be ozonized is forced or otherwise made to pass through the case containing the plates, by a pipe made of a suitable material, having an exit by a pipe or otherwise at the opposite end, after circulating among and passing between the plates, which are electrified by a current of electricity passing from one to another, furnished by a suitable battery.

The plates may be made of metal or other suitable substance for conducting and attracting the electricity, and insulated from contact with each other by proper non-conducting material.

Figure 1 is a side elevation of the apparatus embodying my invention.

Figure 2 is an end elevation of the same, showing the supports to the plates.

Figure 3 is a similar apparatus made with a series of tubes, one within the other, silvered or covered with foil, similar to fig. 1, only being round instead of square.

Figure 4 is a longitudinal section of fig. 3.

Figures 5 and 6 are an outside view of the casing containing the plates or tubes, which is made to conform to their shape, either round, square, or octagonal.

A is the box, fig. 1, containing the plates, which should be coated on the inside with some insulating material also, to withstand the action of the ozone generated within.

B are the inlet and outlet for the air or oxygen to be passed through, which should be made of material to withstand the action of the ozone.

C are the insulated plates, silvered or otherwise rendered conductors on one side, kept apart from contact with each other, and supported on their longitudinal sides by glass supports D, or their equivalents. Between these the air or oxygen passes.

E are the terminals of a suitable battery, either chemical or mechanical, their opposite wires being connected to the alternate plates.

When the air or oxygen is to be ozonized, the wires E are connected with the battery by binding-screws F, or otherwise, and the battery set in action.

The air or oxygen, after being suitably prepared, is forced through the apparatus by the proper means. The electricity passing between the plates, acting on the oxygen, converts it into ozone, which, passing out of the opposite end of the apparatus from where it entered, is to be applied as required.

I claim as my invention—

1. The combination of a series of tubes or plates of metal or other suitable material, or glass rendered a conductor of electricity, or its equivalent, by being coated with metal or other substance, with a series of passages or interstices between or among them for the circulation of a current of air or oxygen caused to be passed therein and through, after being suitably prepared therefor by proper means, in connection with a galvanic or electric current, substantially as and for the purpose hereinbefore set forth.

2. The combination of the plates C, spaces D', casing A, inlet and outlet B, battery terminals E, binding-screws F, supporting-insulators D for plates, substantially as and for the purpose hereinbefore set forth.

CLEAVELAND F. DUNDERDALE.

Witnesses:
J. L. WATSON,
CHARLES M. WILEY.